United States Patent

[11] 3,602,826

| [72] | Inventors | William F. List<br>Lithicum;<br>Roland A. Anders, Baltimore, both of, Md. |
|---|---|---|
| [21] | Appl. No. | 887,860 |
| [22] | Filed | Dec. 24, 1969 |
| [45] | Patented | Aug. 31, 1971 |
| [73] | Assignee | Westinghouse Electric Corporation<br>Pittsburgh, Pa. |

[54] ADAPTIVE SIGNAL DETECTION SYSTEM
14 Claims, 2 Drawing Figs.

[52] U.S. Cl............................................... 328/117,
307/235, 307/246, 328/63, 328/103, 328/147,
328/151, 328/152
[51] Int. Cl...................................................... H03k 5/20
[50] Field of Search........................................... 307/221,
235, 238, 246; 328/34, 37, 61, 63, 116, 117, 128,
130, 146, 147, 148, 154, 145, 151, 103, 152

[56] References Cited
UNITED STATES PATENTS

| 3,364,466 | 1/1968 | Stine | 328/151 X |
| 3,387,222 | 6/1968 | Hellwarth et al. | 307/235 X |
| 3,493,874 | 2/1970 | Finkel et al. | 328/151 |

Primary Examiner—Donald D. Forrer
Assistant Examiner—L. N. Anagnos
Attorney—Brufsky, Staas, Breiner and Halsey ABSTRACT: Apparatus for detecting information signal level variations in the presence of noise or other background level variation phenomena, includes an array of sensors or transducers to convert energy to be detected to a form suitable for processing, such as representative electrical signals. The signals are sequentially sampled according to a predetermined scanning sequence of the sensor array, and are processed in parallel channels on a synchronized element-by-element basis to derive therefrom amplitude representations of level variations occurring over maximum and minimum time intervals related to intervals over which information signal level variations can be expected to occur. These amplitude representations are then compared as an indication of whether they represent actual information signal or simply noise.

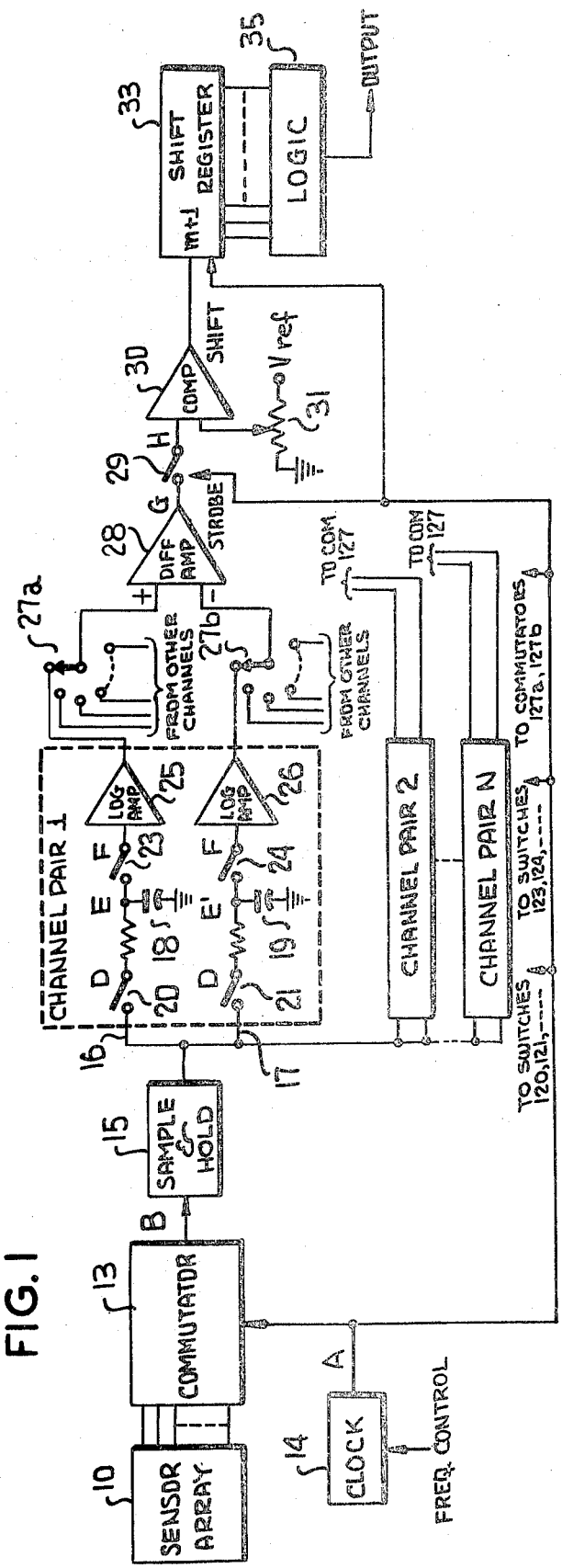
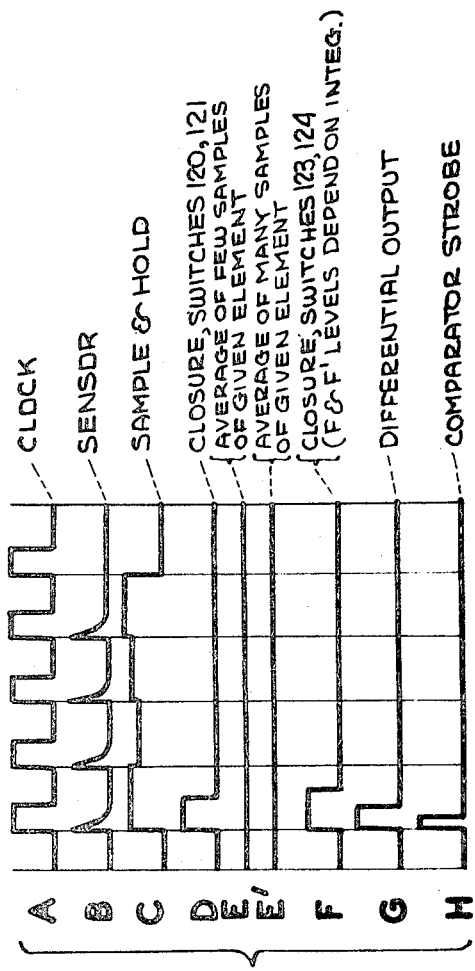

ADAPTIVE SIGNAL DETECTION SYSTEM

BACKGROUND OF THE INVENTION

1. Field of the Invention

The present invention relates generally to the detection of low level information signals, and more particularly to systems for receiving electromagnetic perturbations and for determining whether these perturbations represent actual information-bearing signals or merely noise or other interference.

2. Prior Art Considerations

It is frequently desirable to detect small signal level variations in the presence of noise or other background interference. This is usually achieved by means of specialized filter circuit arrangements or similar means which will serve to reduce the background level, thereby emphasizing or enhancing the information signal level to be detected. Unfortunately, it is not always clear whether the incoming signal is a true intelligence signal or simply noise, and filtering serves no useful purpose in a situation where the frequency and/or variations in level are comparable. Systems requiring examination of sampled data for such a determination include radar, communications, electronic countermeasures, and electro-optical sensing, to name a few. In particular, it is frequently desirable in such systems to automatically analyze a train of pulses to determine whether a predetermined set of decision criteria has been met.

An example of this situation is one in which the basic signal source is the input to or the energy detected by a linear array (e.g., a strip) of photosensors, and the outputs of the sensors are multiplexed to form a train of pulses whose respective amplitudes depend upon the intensity of light incident on the respective sensors along this strip. That is, the instantaneous level of each pulse is a function of the relative amount of light falling on a particular sensor as compared to the average light on the entire sensor strip, and additionally depends upon the transfer function characteristic of the particular sensor involved. Typically, the transfer function is substantially uniform from element to element, although some differences will exist as a result of variations in leakage, responsivity, and ambient temperature. Such variations preclude simply comparing the output of each sensor with the next sensor to determine presence or absence of signal. Moreover, these differences, coupled with the additional signal level variations resulting from noise, result in unreliable variations which may appear to be of informational content, and which therefore result in errors in the transmission of information.

Accordingly, it is a principal object of the present invention to provide a signal detection system in which incoming sampled data is automatically analyzed to determine whether a variation in instantaneous signal level represents actual signal or mere interference.

It is another object of the present invention to provide such a system for analyzing sampled data on the basis of conformance with, or deviation from, a set of decision criteria.

SUMMARY OF THE INVENTION

Briefly stated, according to the present invention, sampled data in the form of a train of input pulses obtained from sequential scanning of an array of sensors is processed for automatic analysis of the pulse train to determine when a predetermined set of decision criteria has been fulfilled. In a preferred form of the invention, the decision criteria relate to whether or not an energy variation detected by the sensor array constitutes signal information or merely background perturbations, such as noise.

In an embodiment of the present invention implemented to accomplish this function, the outputs of a plurality of sensors (again, for example, a strip or line of sensors) are successively commutated to a sample and hold circuit, which thereby supplies an input to a pair of integrator circuits connected in parallel. One of the integrator channels has a time constant associated with the minimum time over which actual information signal can exist, whereas the other integrator channel has a time constant associated with the maximum time over which information signal can exist. The levels stored in the two channels are periodically checked and converted to logarithmic form for emphasis of signal variations and for comparison against one another. Alternatively, the stored levels may be directly compared and the signal representing the difference of the two may then be subjected to logarithmic amplification.

The logarithmic difference signal is then compared with a threshold level which has been preselected as a decision level, such that if the difference is greater than the threshold an actual information signal is considered to have occurred. Successive occurrences of difference signal exceeding the threshold, which may be of a specified number or of a specified sequence of occurrence, are then utilized as the basis for a decision on whether an actual informational signal variation has occurred at the sensor strip. Accordingly, the system functions as an adaptive analyzer.

BRIEF DESCRIPTION OF THE DRAWING

In describing the preferred embodiments of the invention, reference will be made to the following figures of drawing, in which:

FIG. 1 is a block diagram of an embodiment of the invention for use in signal detection in the presence of noise or other obscuring background; and FIG. 2 is a set of waveforms occurring at various points in the system of FIG. 1.

DESCRIPTION OF THE PREFERRED EMBODIMENT

With reference now to FIG. 1, a set of decision criteria is implemented in circuitry shown in that figure, to detect and to emphasize the existence of information signal in contrast to extraneous background levels. In describing this embodiment of the invention, which is specifically implemented for adaptive signal detection of sampled pulse data, several assumptions are made regarding the character of the input, as an indication of the manner in which the set of decision criteria is assembled. It is assumed first that the energy detected by any sensor of an input sensor array (e.g., a strip) may have a variation of up to 100:1 with respect to the energy detected by any other sensor along the line or strip. This variation of 100:1 may occur regardless of the presence or absence of actual information signal at the sensor element, i.e., the variation may occur purely as a consequence of difference in background levels at the two or more sensors. It is further assumed that the signal power density versus time for information signals is a function which will permit the output of any specific sensor element to increase or to decrease relative to the case in which there is an absence of signal. A further assumption is made that for any given sensor element, input signal can exist for no less than $t_{min}$ seconds and for no longer than $t_{max}$ seconds, and that it will not affect more than $m$ elements or less than $n$ elements.

It is desired that a variation of less than ± 10 percent of incident signal level be sufficient to provide a basis for the decision as to whether the detected variation represents an actual information signal or merely extraneous background levels, such as noise. Thus, discrimination between signal and background is to be obtained in a detection system with a sensor spatial size of $n < N < m$, where $N$ is the number of sensors; a signal time duration of $t_{min} < T < t_{max}$; and a signal level change of less than ± 10 percent (and preferably, less than ± 8 percent); over a dynamic range in excess of 100:1.

Referring now to FIG. 1, a system implementing these decision criteria includes a sensor array 10 in the form of a linear sensor strip composed of a plurality of elements responsive to a desired form of energy to be detected, such as the level of light incident on each sensor, where each sensor is a photoelectric detector. Sample outputs of the sensors are sequentially supplied to a sample and hold circuit 15 for equal intervals of time by a commutator 13 at a duty cycle or timing cycle determined by pulses from a clock 14. In the specific example shown, the commutated sensor output levels constitute a return-to-zero (RTZ) video (wide band) pulse train, although this is not critical to the invention either as to its construction or its operation.

The signal level present in sample and hold circuit 15 and constituting the output of a respective sensor of the sensor array 10, with any residual level stored as a result of past operation, is applied to a pair of parallel channels 16, 17. If desired, the application of signal from the sample and hold circuit to channels 16, 17 may follow buffer amplification of the sample and hold circuit output. Each channel includes an integrator 18, 19, which, although shown as being of the simple resistive-capacitive (e.g., Miller) integrator type, may be of any desired type; a logarithmic amplifier 25, 26 connected to receive the result of the respective integration via a switch 23, 24; and an input switch 20, 21 through which the sample and hold circuit output level is supplied to the respective integrator.

In one channel, e.g. 16, the integrator has a charging time constant equal to $t_{min}$, that is, a time constant selected according to the minimum time over which input signal can be expected to occur. In channel 17, the integrator has a charging time constant equal to $t_{max}$, the maximum time over which input signal can be expected to occur, these time intervals having been selected in accordance with the predetermined decision criteria as obtained from an a priori knowledge of the general form of the input signal desired to be detected.

For the simple RC integrators shown in FIG. 1, a voltage is developed across each capacitor as a function of the magnitude of the same input signal, the amplitudes of the voltages thereby stored across both capacitors at the conclusion of the respective charging intervals being dependent not only on the input signal level but on the respective time constant associated with the integrator. The amount of noise of other background interference, on the other hand, will be identical or substantially identical, on the average, for each signal processing channel. Should the input signal remain constant over a time interval which is long in comparison to the length of $t_{max}$, then the voltage levels developed across both integrator capacitors will be identical. This situation would exist, for example, where only background level or noise level were present for a length of time greater than $t_{max}$. On the other hand, where information signal is present, and undergoes some change during the interval $t_{max}$, the voltage across the faster integrator (that is, the one having the time constant $t_{min}$) will increase or decrease faster than the voltage across the slower integrator ($t_{max}$). In the latter instance, two different levels will be stored in the two integrators 18, 19.

Preferably, a pair of channels is employed for each sensing element sampled. Thus, for example, if 10 sensing elements were utilized and had their output levels commutated into sample and hold circuit 15, 10 distinct and different pairs of processing channels would be provided for determining the extent of time over which input signal occurs at each respective sensor. Obviously, it is necessary and desirable that the clock pulses from clock 14 be sufficiently long that the output of each sensor is sampled for an interval greater than $t_{max}$.

To conserve processing channels, a different arrangement may be utilized for the integration system than that which would require a distinct and different pair of channels for each sensor element. In particular, a single pair of processing channels could be utilized in which the respective capacitors of integrators 18 and 19 have discharge time constants to permit their discharge in an interval of time less than the time between successive pulses in the time-divided signal from sample and hold circuit 15. Such an arrangement is acceptable, provided, however, that the spacing between pulses required for complete discharge of the capacitors is acceptable in view of the type of input signal being detected. That is to say, if a spacing between the successive pulses in a multiplex signal is such that in order to allow discharge of the integrator capacitors, substantial signal might be lost, then it would be preferable to use the distinct pairs of integrator channels for each sensing element, rather than a single pair of processing channels for all elements.

The voltage levels representing the results of the integration by the two integrators 18, 19 are supplied via respectively commutated switches 23, 24 to a pair of logarithmic amplifiers 25, 26. The switches 20, 23 for channel 16, and 21, 24 for channel 17 are preferably timed to operate in accordance with the charging time constant of the respective integrators.

Each logarithmic amplifier is effective to convert its linear input signal level, consisting of the voltage level appearing across the capacitor of the respective integrator circuit, to a logarithmic representation of that linear signal. The logarithmic outputs of amplifiers 25 and 26 are applied to respective input terminals of a differential amplifier 28, which, because it computes the difference of two logarithms, produces an output which corresponds to the logarithm of the quotient of the two integrator outputs. This is desirable because it is detection of a fixed percentage variation, rather than detection of a fixed absolute difference, in signals, which is being sought. That is, the output of differential amplifier 28 is a signal level representing the difference of the logarithmic inputs thereto and is consequently proportional to the ratio of the two integrator outputs. If desired, however, the logarithmic conversion may be effected after, rather than before, differential amplification. If several pairs of parallel connected channels are employed, based on the number of sensing elements employed, the outputs of the integrators (after logarithmic amplification, if processing is carried out as shown in FIG. 1) for each pair of channels are commutated into the same differential amplifier 28 in the sequence in which the signals are processed. Thus, the outputs derived from the first pair of channels are applied to amplifier 28, and then the outputs of the second pair, and so forth. Commutating switches 27a, 27b, operated by timing pulses from clock 14, are utilized for this purpose.

The output level generated by differential amplifier 28 is supplied to a high gain, double-ended comparator circuit 30 via a switch 29 which is "strobed," i.e., opened and closed, at a rate effective to activate the comparator during the respective sample period only after the logarithmic amplifier levels have become firmly established. To that end, the strobing of switch 29 is accomplished by reference to the same master clock 14, with the clock pulses appropriately modified, if necessary, as is employed to operate commutator 13, switches 20, 21 and switches 23, 24.

Comparator 30 is double ended (i.e., has a differential input) because the output of differential amplifier 28 may be positive or negative depending on which of the two integrators of the channel under consideration has the greater output level. The voltage reference level for the comparator is provided as an adjustable threshold level, using potentiometer 31, set to a magnitude according to the desired "false alarm" rate for the system. Thus, having set the threshold, in order for an output level of differential amplifier 28 to be considered as being derived from actual information signal, that output must exceed the threshold level as referenced to one input terminal of comparator 30. In the event that the threshold is exceeded, the comparator is triggered, or switched, to produce a pulse representing a signal detection count for the particular sample under consideration.

The detection pulse produced by comparator 30 under the aforementioned conditions, is fed to an "$m+1$" length shift register, which is clocked (shifted) at the system sampling rate by application of pulses from the master clock. The shift register stages are coupled to appropriate logic circuitry 35 to respond to the occurrence of at least $n$ but less than $m$ detection pulses indicating actual information signal level, as presently contained within the shift register, and if that condition exists, to generate an output pulse. On the other hand, if less than $n$ pulses or more than $m$ pulses are presently contained within shift register 33, no output pulse is generated. The occurrence of an output pulse from the logic circuitry therefore indicates that the set of implemented decision criteria has been met by present signal detected by the sensors. This output pulse may be used for an appropriate control or indication function, such as the control of other circuitry, or the alerting of a system operator, or for other purposes.

Clearly, to effect the preceding operation, it is essential that the outputs of the several channels to which samples are applied from respective sensors of sensor array 10 be supplied to shift register 33 so that at least $n$ but less than $m$ detection pulses may be determined to be presently existing (or not) in the register. One factor in this determination is that the detection pulse count in the shift register may be derived from signal detected by any of the sensor elements regardless of location of those elements in the scan of sensors. This may be objectionable in some instances because it is likely that the energy (signal) to be detected will activate contiguous sensors (and therefore, will produce contiguous detection pulses in the course of the scan) rather than sensors randomly distributed throughout the scanning sequence. That is, contiguous channels, rather than randomly distributed channels, will more likely be carrying information signal to be detected. Thus, in order to provide a more "false-alarm free" detection decision, a predetermined number of detection pulses obtained from contiguous channels may be selected as the basis for producing an alarm, or for other purposes, by properly implementing the logic circuitry 35. In the system depicted in FIG. 1, this may be accomplished by providing a shift register 33 of length $n$ (i.e., having a number of stages equal to the minimum detection length), loaded sequentially by pulses emanating from the comparator 28. If $n$ detections are made in sequence anywhere in the scan, the logic circuitry 35 indicates the detection of information signal. The use of logic circuitry that will provide an output indicating information signal detection regardless of the location of the detection pulses in the scanning sequence has somewhat inferior false-alarm performance, to that in which a predetermined number of consecutive channels is used to indicate detection. A greater probability of detection than the consecutive channel approach with a false-alarm performance somewhere between the two preceding approaches may be achieved by a compromise requiring a certain percentage of the $n$ contiguous channels to be activated to indicate detection. This prevents any loss of detection in the event that for a given channel the pure background level, that is, the level absent any information signal, is similar to or equal to the level with actual information signal present.

Discrimination against signals with greater than $m$ contiguous detections can be achieved by providing a shift register with a number of stages equal to that number of sensors. The first $n$ stages of the register provide the basis of decision of signal detection as described above. This decision may be stored for $m-n$ counts, by setting a flip-flop (not shown) for example. Further logic is provided to detect whether all $m$ stages are full at this time, and, if so, the stored decision is rejected. This form of revision is useful to prevent an indication of detection in the presence of jamming or rapid overall change in background.

Waveforms appearing at correspondingly alphabetized points in the circuit of FIG. 1 are shown in FIGS. 2A through 2H. For example, with reference to FIG. 2B, a train of pulses is obtained at the output of commutator 13, representing samples of signal at the outputs of the sensing elements in the array over a complete scan of those elements. This would be followed by a second scan of the elements, and so forth. Integrator 18 in channel 16, which has the short time constant ($t_{min}$), will integrate the incoming consecutive samples of output for a single element, in accordance with the repeated closure of switch 20 at intervals in which the samples corresponding to that element occur, and will thus average only a few samples from the given element. On the other hand, integrator 19 in channel 17 has a long time constant and will therefore produce an output representing the average of many samples of the given element. These waveforms are shown in FIGS. 2E and 2E', respectively, for outputs E and E' of the integrators of FIG. 1.

In order to utilize but a single pair of integrator channels, rather than a distinct and different pair for each sensor, commutator 13 must be constructed and arranged to sample the output of any given sensor several times in sequence, i.e., to repeatedly sample the output of the same sensor, and then to go on to the next sensor in the line and repeatedly sample its output the same number of times. The capacitors of the integrators in channels 16 and 17 would require simultaneous discharge (and complete discharge) within the interval between the conclusion of the integration of sample pulses from one element and the beginning of sample pulses from the next element in the sequence. This also requires appropriate timing of the switches, which is readily accomplished using the clock pulses from clock 14, (modified as necessary).

The system of FIG. 1 has several significant features. First, it provides for spatial size discrimination and time discrimination over a wide range of signal levels, and it operates to achieve its intended purpose regardless of the sense of the change of signal level at the various sensors to be compared. Accordingly, the system is operative with a wide variation in background level (in the absence of signal) from sensor to sensor. Second, the system automatically adapts to operation over a wide range of clock frequencies, in excess of 100:1, because threshold decisions are based on ratio of power in the integrators, rather than on absolute levels. This ability of the system to respond over a wide range of clock speeds is especially advantageous in photosensor applications, e.g., in imaging systems, because it permits the use of automatic "aperture" control by way of simple variation of clock rate, to greatly increase the dynamic range of the system.

The use of parallel channels provides a high degree of automatic temperature compensation, as well as removes extraneous background, because both channels drift together with temperature and contain virtually identical components, and because both channels are responsive to the same input signal during the same intervals. The overall system configuration lends itself to fabrication by integrated circuit techniques.

While we have disclosed a preferred embodiment of our invention, it will be apparent from a consideration of the foregoing description that variations may be resorted to without departing from the spirit and scope of the invention, as defined in the following claims.

We claim as our invention:

1. Apparatus for detecting information signal level variations in the presence of noise level variations, said apparatus comprising:

an array of sensing elements responsive to energy of a form which may consist of both information and environmental background, for generating electrical signals functionally related to the respective levels of said energy, means for generating a train of timing pulses at a selectively variable repetition rate, means responsive to said timing pulses for sequentially sampling the signals generated by the sensing elements of said array, means selectively responsive, in accordance with said timing pulses, to the samples appearing in said sequence for deriving therefrom amplitude representations of the level variations occurring in a predetermined minimum time interval and a predetermined maximum time interval over which information signal level variations are expected to occur, and means responsive to said amplitude representations over said time intervals for comparison thereof as an indication of whether they are derived from information signal or background noise.

2. The invention according to claim 1 wherein said means for deriving representations includes means for converting the representations to logarithmic form, and wherein said comparison means includes means for detecting the difference in amplitude of respective logarithmic variations derived for said time intervals, as a ratio of the original representations.

3. The invention according to claim 1 wherein said means for deriving representations includes first and second integrator means in respective parallel channels for processing the signal samples from a selected sensing element, one of said integrator means having a substantially longer time constant of integration than the other of said integrator means, the time constants of said first and second integrator means corresponding to the extremes in time over which information signal is expected to occur, whereby differences in the results of integration by said first and second integrator means are obtained for information signal level variations as a consequence of the difference in the number of signal samples averaged by the integrations performed by the two integrator means, while background noise level variations sensed by said selected sensing element and processed by the two integrator means have substantially the same average values regardless of said difference in time constants of integration.

4. The invention according to claim 3 further including means responsive to the sequential signal samples for retention of the level of each sample applied thereto from application of that sample to application of the next consecutive sample thereto, as the sample levels to be applied to said means for deriving representations.

5. The invention according to claim 4 wherein said means for deriving representations includes distinct and different sets of said parallel channels for each of said sensing elements of said array, each set of parallel channels having first and second of said integrator means, and switch means responsive to said timing pulses for supplying the sample levels attributable to each sensing element to the corresponding set of parallel channels, during scanning of said elements.

6. The invention according to claim 5 wherein the outputs of each set of parallel channels are commutated in a sequence of parallel channels corresponding to the scanning sequence of the elements in said array, to said comparison means, and wherein said comparison means includes differencing means responsive to the outputs of each single set of parallel channels for deriving the difference in level thereof, and means responsive to each said difference in level derived by said differencing means for reference respectively against a predetermined threshold level below which information signal is deemed to be absent from the sensed energy which resulted in the respective difference in level.

7. The invention according to claim 6 wherein said comparison means further includes means responsive to the number of differences in level exceeding said threshold level, as detected by said referencing means in a predetermined time interval, as the basis of a decision on whether information signal is present.

8. A system for extracting information from a train of pulses, comprising a plurality of channels connected for parallel reception of pulses in said train, means synchronized with the timing of the pulses in said train for selectively completing a circuit path in each of said channels for passage of pulses therethrough, said plurality of channels being paired, and each channel of a pair including means for sensing energy in a pulse applied thereto and for retaining a signal level representative of that energy, means responsive to signal levels retained by said retaining means in both channels of a pair of channels for detecting the difference in levels therebetween at times based on said timing of said pulses, means responsive to each difference in level detected by said detecting means for conversion of each difference level to a value representative of its significance relative to a predetermined reference level, and means for accumulating said conversion values in accordance with said timing of said pulses, as an indication of the information content in said train of pulses.

9. The system of claim 8 wherein said circuit path completing means completes circuit paths simultaneously in both channels of each pair of channels, to pass pulses to be processed by a predetermined pair of channels concurrently to both of said retaining means thereof, and wherein each of said retaining means comprises integrating means for averaging the level of incoming pulses over a time interval depending upon the respective time constant of the integrating means, said integrating means of both of said channels having different time constants.

10. The system of claim 9 wherein the time constant of one of said integrating means is related to the minimum time over which information is expected to be present in a predetermined set of said pulses, and the time constant of the other of said integrating means is related to the maximum time over which information is expected to be present in a predetermined set of said pulses.

11. The system of claim 10 wherein said train of pulses is obtained from repeated scanning of the outputs of a plurality of energy detectors, and wherein a separate and distinct pair of channels is provided for pulses derived from each respective energy detector, said circuit completing means completing circuit paths in a given pair of channels only during the interval in which the pulses derived from the energy detector associated with that pair of channels occur in said pulse train.

12. The system of claim 11 wherein said conversion means comprises means for comparing the difference in level detected by said detecting means with a selectively variable threshold level constituting said predetermined reference level, and for generating an output if and only if the difference in level detected in a timing interval exceeds said threshold level.

13. The system of claim 12 wherein said accumulating means comprises means responsive to the number of outputs generated by said comparing means over a preselected number of scans of said energy detectors for indicating the presence or absence of information on the basis of whether said number of outputs is respectively greater or less than a predetermined number.

14. The system of claim 13 wherein said number of outputs is responded to by said means for indicating presence of information, only if said outputs are derived from consecutive energy detectors.